(12) United States Patent
Bak

(10) Patent No.: US 6,212,608 B1
(45) Date of Patent: Apr. 3, 2001

(54) METHOD AND APPARATUS FOR THREAD SYNCHRONIZATION IN AN OBJECT-BASED SYSTEM

(75) Inventor: Lars Bak, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/102,980

(22) Filed: Jun. 22, 1998

Related U.S. Application Data

(63) Continuation-in-part of application No. 08/743,484, filed on Nov. 4, 1996.
(60) Provisional application No. 60/057,050, filed on Aug. 27, 1997.

(51) Int. Cl.$^7$ .................................................. G06F 12/14
(52) U.S. Cl. ..................... 711/152; 711/150; 711/163; 711/156
(58) Field of Search .................................. 395/406, 527; 711/2, 6, 1, 147, 148, 202, 207, 150, 152, 156, 163, 200, 128, 132

(56) References Cited

U.S. PATENT DOCUMENTS

| | | | |
|---|---|---|---|
| 4,525,780 | 6/1985 | Bratt et al. ............................ 364/200 |
| 5,020,080 | * 5/1991 | Tanguy et al. ........................ 375/324 |
| 5,060,144 | 10/1991 | Sipple et al. ........................... 364/200 |
| 5,136,712 | 8/1992 | Perazzoli, Jr. et al. .............. 709/104 |
| 5,379,432 | * 1/1995 | Orton et al. .......................... 709/303 |
| 5,414,839 | 5/1995 | Joshi ..................................... 395/600 |
| 5,442,758 | 8/1995 | Slingwine et al. ....................... 707/8 |
| 5,598,562 | 1/1997 | Cutler et al. .......................... 709/104 |
| 5,630,136 | * 5/1997 | Davidson et al. .................... 709/106 |
| 5,684,974 | 11/1997 | Onodera ................................ 395/412 |
| 5,701,470 | * 12/1997 | Joy et al. .............................. 707/103 |
| 5,727,178 | 3/1998 | Pletcher et al. ...................... 395/412 |
| 5,732,404 | 3/1998 | Johnson et al. .......................... 711/2 |
| 5,822,588 | * 10/1998 | Sterling et al. ......................... 717/4 |
| 5,893,912 | 4/1999 | Freund et al. ........................ 707/103 |
| 5,924,098 | 7/1999 | Kluge ................................... 707/100 |
| 5,951,672 | * 9/1999 | Kwok et al. ........................... 712/28 |
| 6,021,469 | * 2/2000 | Tremblay et al. .................... 711/125 |

* cited by examiner

*Primary Examiner*—Behzad James Peikari
*Assistant Examiner*—Matthew D. Anderson
(74) *Attorney, Agent, or Firm*—Beyer Weaver & Thomas, LLP

(57) ABSTRACT

Methods and apparatus which enable threads to lock and to unlock objects disclosed. According to one aspect of the present invention, a method for associating an object with a first thread includes obtaining the contents of the object header field of the object. The contents obtained from the object header field are then stored into a first location within a stack which is associated with the first thread. A reference indicator, which identifies the stack in which the contents obtained from the object header field are stored, is then stored in the object header field. In one embodiment, the method further includes updating a status indicator associated with the object to essentially show that the reference indicator is stored in the object header field. In such an embodiment, the contents of the object header may include a header value, and the status indicator may be updated to indicate that the object is accessible to the first thread.

6 Claims, 6 Drawing Sheets

METHOD AND APPARATUS FOR THREAD SYNCHRONIZATION IN AN OBJECT-BASED SYSTEM

CROSS REFERENCE TO RELATED APPLICATIONS

The present invention is a continuation-in-part of co-pending U.S. patent application Ser. No. 08/743,484, filed Nov. 4, 1996, and claims the priority of co-pending provisional U.S. patent application Ser. No. 60/057,050, filed Aug. 27, 1997, and co-pending U.S. patent application Ser. No. 08/957,955, filed Oct. 27, 1997, which are incorporated herein by reference in their entirety.

BACKGROUND OF THE INVENTION

1. Field of Invention

The invention relates generally to methods and apparatus for locking and unlocking objects in an object-based system. More particularly, the invention relates to methods and apparatus for enabling multiple threads to operate synchronously, and efficiently, in an object-based system.

2. Description of Relevant Art

An object generally includes a set of operations and a state that remembers the effect of the operations. Since an object has some memory capability, an object differs from a function, which has substantially no memory capability. For example, a value returned by an operation associated with an object is dependent upon the state of the object as well as the arguments to the operation. As such, each invocation of an object may have a different result. In contrast, a value returned by a function is typically dependent only on the arguments to the function. Accordingly, for a given set of arguments, each invocation of a function will have the same result.

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

Threads may generally be either "cooperative" or "concurrent." Threads are considered to be cooperative when a single thread maintains complete control, e.g., control of a computational resource such as a processor or a process, until the thread voluntarily relinquishes control. Concurrent threads, on the other hand, are arranged such that although a thread may also voluntarily relinquish control, other threads may essentially cause the thread to involuntarily relinquish control.

In a concurrent threading model, multiple threads are allowed to execute independently of one another. Rather than being cooperatively scheduled like cooperative threads, concurrent threads are preemptively scheduled. That is, a computation by a given concurrent thread may be preempted at any point in time by an outside entity such as another concurrent thread, e.g., a scheduler, or the operating system. Thread preemption may occur because of meaningful events in the execution of a program. By way of example, a meaningful event may be when a thread's priority is programmatically raised to be higher than that of a currently running thread. Alternatively, thread preemption may occur because of artificially induced events such as the elapsing of a particular interval of time.

During the execution of an object-based program, a thread may attempt to execute operations which involve multiple objects. On the other hand, multiple threads may attempt to execute operations which involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization construct before invoking the method.

In addition to the synchronized operations defined on a given object, there may be some number of non-synchronized operations defined on that object. Non-synchronized operations are not prevented from being simultaneously executed on a given object by more than one thread. Several non-synchronized operations may be executed at once on a given object, and one or more non-synchronized operations may be executed at the same time as a synchronized operation.

In order to prevent more than one thread from operating on an object at any particular time, objects are often provided with locks. The locks are arranged such that only the thread that has possession of the lock for an object is permitted to execute a method on that object. With respect to FIG. 1, a process of acquiring an object lock will be described. The process of acquiring an object lock begins at step 104 where a thread obtains the object on which the thread wishes to operate. In general, the object on which the thread intends to operate has an associated object lock. Then, in step 106, a determination is made regarding whether the object is locked. That is, a determination is made regarding whether the object lock associated with the object is held by another thread, e.g., a thread that is currently operating on the object.

Such a determination may include the use of synchronization constructs, as will be appreciated by those skilled in the art, to track the status of objects. The use of synchronization constructs to study an object is often relatively inefficient in that a software cache or a hash table of synchronization constructs must typically be searched in order to locate the proper synchronization construct for use with a given object. Such searches may prove to be time-consuming, and generally utilize relatively large amounts of computer system resources. The cache of synchronization constructs, in itself, typically occupies a significant amount of computer memory. In addition, the memory management associated with allocating a synchronization construct for an object when a suitable monitor does not already exist may be costly. Finally, as synchronization construct caches may be shared among multiple threads, they themselves may have to be locked prior to access or update, which both imposes additional costs in execution time and also introduces a source of locking contention that occurs when more than one thread wants to access the synchronization construct cache at one time.

If the determination in step 106 is that the object is not locked, then the thread acquires the object lock in step 108. Alternatively, if the object is locked, then the thread waits for the object to be unlocked in step 110. Once the object is unlocked, process flow moves from step 110 to step 108 where the object is locked by the thread.

As previously mentioned, a thread is permitted to execute a synchronized operation on an object if it successfully acquires the lock on the object. While one thread holds the lock on an object, other threads may be allowed to attempt to execute additional synchronization operations on the object, and may execute non-synchronized operations on the object. Thread synchronization is a process by which threads may interact to check the status of objects, whether the objects are locked or unlocked, while allowing only the thread which holds an object lock to execute synchronized operations on the locked object. Thread synchronization also enables threads to obtain and remove object locks.

As previously mentioned, a thread is permitted to execute a synchronized operation on an object if it successfully acquires the lock on the object. While one thread holds the lock on an object, other threads may be allowed to attempt to execute additional synchronization operations on the object, and may execute non-synchronized operations on the object. Thread synchronization is a process by which threads may interact to check the status of objects, whether the objects are locked or unlocked, while allowing only the thread which holds an object lock to execute synchronized operations on the locked object. Thread synchronization also enables threads to obtain and remove object locks.

When threads are synchronized, in order to make certain that only the thread that possesses an object lock is allowed to operate on a locked object, synchronization constructs are generally provided. FIG. 2 is a diagrammatic representation of the interface between a thread, an object, and a synchronization construct in an object-based system. A thread 202 attempts to execute a synchronized operation on an object 204. In order for thread 202 to execute the synchronized operation on object 204, thread 202 must first obtain the object lock for object 204.

When thread 202 attempts to execute a synchronized operation on object 204, a synchronization construct 206 which is associated with object 204 is obtained. In general, object 204 is dynamically associated with a synchronization construct, as for example synchronization construct 206*a*, which is arranged to provide synchronized access to object 204. If synchronization construct 206*a* permits re-entrant locking of object 204, it may include a counter 208 which may be incremented to keep track of the number of times object 204 has been locked by thread 202. Synchronization construct 206*a* further includes an object pointer 210 that identifies object 204 or, more generally, the object with which monitor 206*a* is associated. Synchronization construct 206*a* also includes an identifier for thread 202, the thread that currently has locked synchronization construct 206*a*.

A synchronization construct cache is generally a set of data structures and locks that implement a dynamic association between a synchronization construct and an object. For example, object 204 is mapped to synchronization construct 206*a* through a synchronization construct cache. Since synchronization constructs 206 may be of a size comparable to the size of objects, e.g., synchronization constructs 206*a*, 206*b*, 206*c* may require more memory space than some objects, synchronization constructs 206 are often dynamically associated with objects. Dynamically associating synchronization construct 206*a* with object 204 prevents object 204 from being associated with a relatively large amount of memory except when necessary, e.g., when object 204 is locked and synchronization construct 206*a* is in use.

Since synchronization construct 206*a* is not inherently associated with object 204, when thread 202 attempts to execute a synchronized operation on object 204, a search must be made to locate synchronization construct 206*a*. Specifically, a cache 212 of synchronization constructs 206 is searched to locate synchronization construct 206*a*. In general, only one synchronization construct 206 is associated with any given object 204. If a synchronization construct 206 that is associated with object 204 is not found, then a monitor 206 may be allocated using any suitable method.

Synchronization construct caches are described in more detail in U.S. patent application Ser. No. 08/569,805, filed Dec. 8, 1995 and U.S. patent application Ser. No. 08/832,090, filed Apr. 3, 1997, which are herein incorporated by reference in their entirety.

The use of monitors as synchronization constructs to track the status of objects is often relatively inefficient in that a software cache or a hash table of synchronization constructs must typically be searched in order to locate the proper monitor for use with a given object. Such searches may prove to be time-consuming, and generally utilize relatively large amounts of computer system resources. The cache of synchronization constructs, in itself, typically occupies a significant amount of computer memory. In addition, the memory management associated with allocating a monitor for an object when a suitable monitor does not already exist may be costly. Finally, as synchronization construct caches may be shared among multiple threads, they themselves may have to be locked prior to access or update, which both imposes additional costs in execution time and also introduces a source of locking contention that occurs when more than one thread wants to access the synchronization construct cache at one time.

If synchronization constructs are to support re-entrant locking, they may also require explicit counters which are used to track the number of times a given thread relocks an object that it has already locked. The implementation and maintenance of explicit counters may be relatively expensive in terms of the use of computer system resources. Further, since the synchronization construct explicitly keeps track of the thread that has locked it, the synchronization construct must be continually updated. Continually updating the synchronization construct is typically both time-consuming and expensive in terms of the consumption of computer system resources.

The determination of whether an object is locked or unlocked, as described above, may often be time-consuming and expensive. Specifically, the space overhead associated with locking and unlocking synchronized objects is often high, while the execution speed associated with locking and unlocking may be low. Therefore, what is desired is an efficient method and apparatus for locking and unlocking objects. Specifically, what is desired is an efficient method and apparatus for keeping track of the locked status of an object in an object-based system that utilizes synchronized threads.

SUMMARY OF THE INVENTION

Methods and apparatus which enable threads to lock and to unlock objects disclosed. According to one aspect of the present invention, a method for associating an object with a first thread includes obtaining the contents of the object header field of the object. The contents obtained from the object header field are then stored into a first location within a stack which is associated with the first thread. A reference indicator, which identifies the stack in which the contents obtained from the object header field are stored, is then stored in the object header field. In one embodiment, the method further includes updating a status indicator associated with the object to essentially show that the reference indicator is stored in the object header field. In such an embodiment, the contents of the object header may include a header value, and the status indicator may be updated to indicate that the object is accessible to the first thread.

In accordance with another aspect of the present invention, a method for locking an object using a first thread includes obtaining the contents of the header field of the object. Once the contents of the object header field are obtained, a determination is made regarding whether the object is already locked. When the object is determined to be unlocked, then the contents obtained form the object header field are store in a stack that is associated with the first thread. In one embodiment, a reference indicator is stored in the object header field such that the stack may be associated with the object.

According to still another aspect of the present invention, a computer system which includes memory that supports more than one thread also includes a processor which is coupled to the memory. A first mechanism in the computer system is arranged to store the contents of the header field of an object into a first location within a first stack associated with a first selected thread. A second mechanism in the computer system is used to store a reference indicator, which identifies the first stack, into the object header. In one embodiment, the computer system also includes an updater that is arranged to update a status indicator associated with the object to indicate that the reference indicator is stored in the object header.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In a multi-threaded, object-based system, to make it possible to prevent more than one thread from operating on an object at any particular time, objects are typically provided with synchronization constructs. A synchronization construct is generally arranged such that only the thread which has locked a synchronization construct associated with an object is permitted to execute a synchronized operation on that object. Each object may be dynamically associated with a synchronization construct. A cache of synchronization constructs is maintained separately from their associated objects, and must generally be searched in order for an object to be mapped to its associated synchronization construct. Searching for an appropriate synchronization construct, and constantly updating the synchronization construct to reflect the status of the object, is often time-consuming and expensive, in terms of the use of computer system resources.

In the present invention, instead of recording the locking status of an object explicitly through the use of synchronization constructs, the locking status of an object is recorded implicitly, using only the object itself and the stack of the thread locking the object. The header field of an object, when the object is unlocked, contains a header value which includes information relating to the object. When a thread locks the object, the thread places the header value in the execution stack associated with the thread, and places a reference value in the object header field which identifies the thread stack. A locking status indicator in the object header field may then be set to a state which indicates that the object is locked. Then, when another thread attempts to lock the object, that thread may use the locking status indicator to determine that status of the object and, further, use the reference value to identify the thread which currently holds the lock associated with the object.

By implicitly indicating the locking status of an object in the object header field of the object, the use of explicit synchronization constructs, which are expensive, may be eliminated. Eliminating explicit synchronization constructs serves to reduce the computational overhead associated with tracking the locking status of objects. By way of example, the memory management associated with locking synchronization constructs and the computations involved with looking up the synchronization construct associated with an object may essentially be eliminated. As such, implicitly indicating the locking status of an object provides an inexpensive and efficient method for tracking the locking status of the object. It should be appreciated that the present invention may be used to generally eliminate the use of a wide variety of synchronization constructs, e.g., mutexes, monitors, and semaphores.

Figure 1:
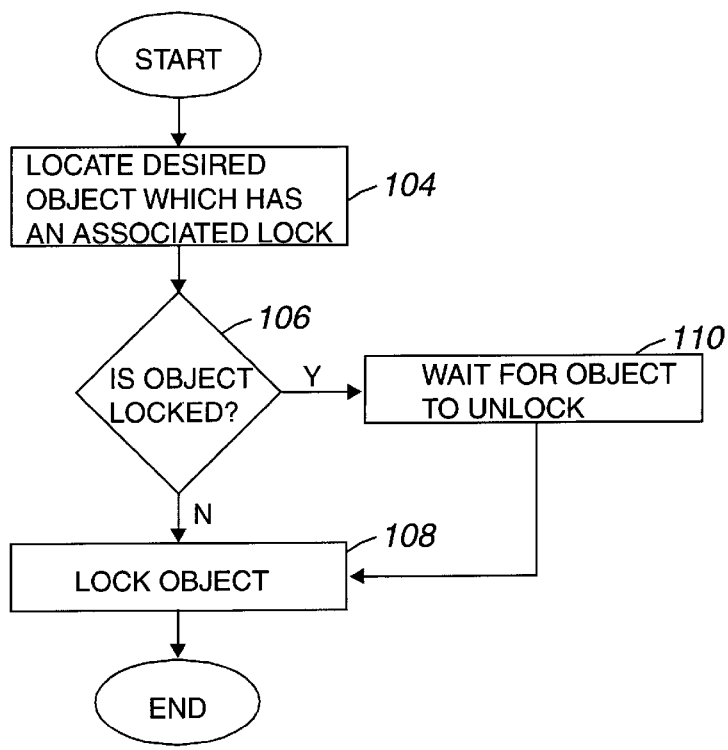
FIG. 1 is a process flow diagram which illustrates the steps associated with locking an object.
Figure 2:
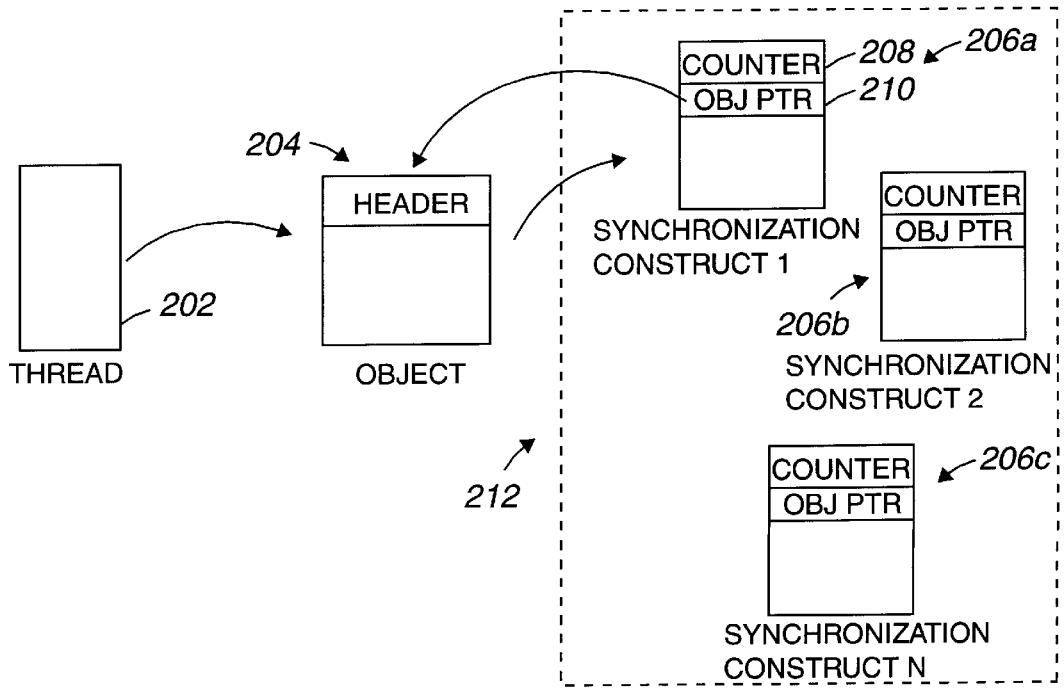
FIG. 2 is a diagrammatic representation of the associations between a thread, a called object, and a set of synchronization constructs.
Figure 3A:
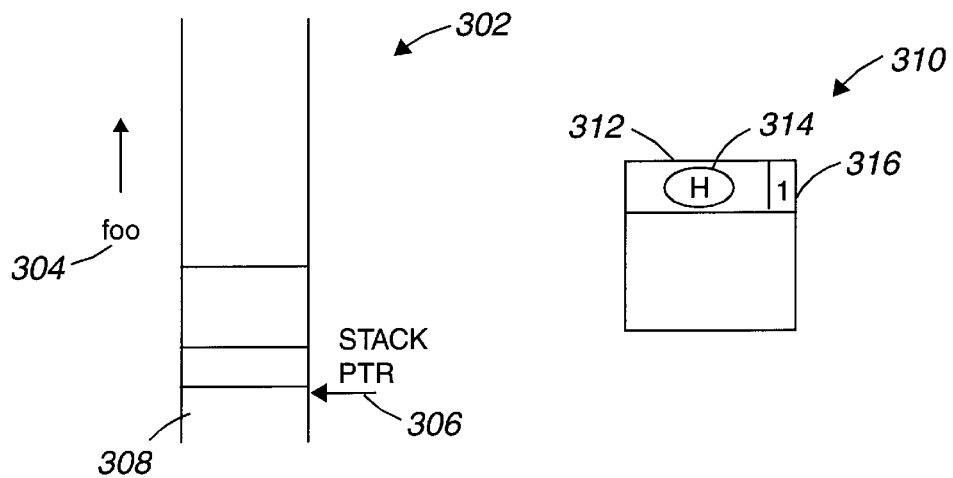
FIG. 3a is a diagrammatic representation of a cooperative thread stack and an object in accordance with an embodiment of the present invention.

If the locking status of an object is implicitly specified, whenever a thread attempts to lock the object, the thread generally studies the locking status indicator associated with the object. The thread may also study contents of the header field of the object to determine the identity of another thread which has either locked the object or is in the process of studying the object. Referring next to FIG. 3a, a thread stack and an object will be described in accordance with an embodiment of the present invention. An execution stack 302, which is local to a thread, is used when a synchronized operation, in this case an invocation of a synchronized method "foo" 304, is invoked. Synchronized method foo 304 is executed on stack 302, as will be appreciated by those skilled in the art. A stack pointer 306 points to a current memory address or location, e.g., location 308, within stack 302.

An object 310, upon which method foo 304 may be invoked, includes a header field 312. When object 310 is unlocked, i.e., free to be locked by a thread, the contents of object header field 312 include a header value 314 and a locking status indicator 316. Header value 314 generally includes information which is relevant to object 310. By way of example, header value 314 may include identity hash values and garbage collection, i.e., memory management, information. Locking status indicator 316, in the described embodiment, is a tag bit which indicates whether object 310 is unlocked. As shown, when locking status indicator 316 has a value of "1," object 310 is unlocked.

Figure 3B:
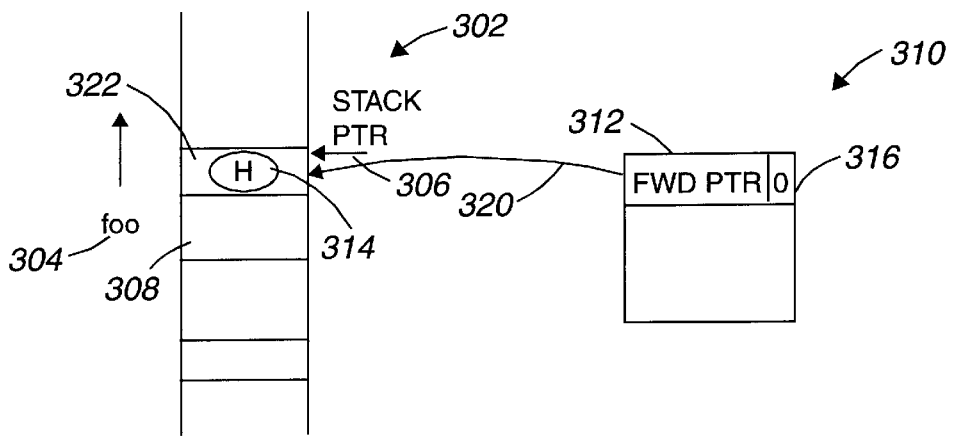
FIG. 3b is a diagrammatic representation of the cooperative thread stack and the object of FIG. 3a after the header value of the object has been placed on the stack in accordance with an embodiment of the present invention.

Prior to the invocation of method foo 304, header value 314 is stored onto stack 302, as shown in FIG. 3b. Then, once header value 314 is stored onto stack 302, the locking status indicator 316 within object 310 is set to indicate that object 310 is locked, i.e., that object header field 312 no longer contains header value 314. In one embodiment, when object 310 is locked, locking status indicator 316 has a value of "0," whereas when the object is unlocked, locking status indicator 316 has a value of "1" as illustrated in FIG. 3a.

A forwarding pointer 320, which refers to a stack header location 322 on stack 302, is stored in object header field 312 when header value 314 is stored on stack 302. Stack header location 322 is the location within stack 302 where header value 314 is stored. As shown, stack pointer 306 also points to stack header location 322 while header value 314 is being stored on stack 306, since stack header location 322 is the current memory location on stack 306 which is in use.

Figure 3C:
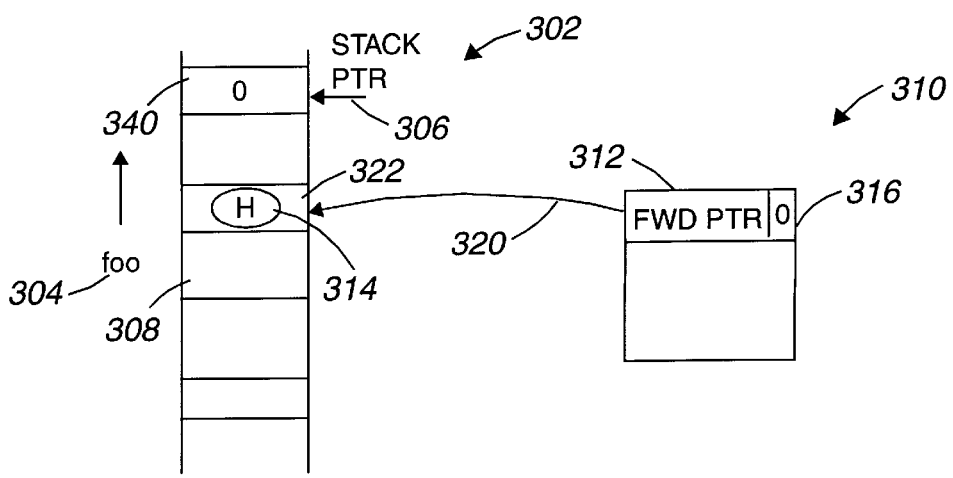
FIG. 3c is a diagrammatic representation of the cooperative thread stack and the object of FIG. 3b after the object has been re-entered by the thread associated with the thread stack in accordance with an embodiment of the present invention.

In general, method foo 304 may invoke other methods. In particular, method foo 304 may transitively invoke another synchronized method bar (not shown) on object 310. When method foo 304 calls method bar on object 310, object 310 will typically need to be used by both the original invocation of method foo 304 as well as by the invocation of method bar. However, since header value 314 is already stored on stack 302, header value 314 may not be re-obtained for storage on stack 302. Instead, an indicator value 340, e.g., "0," may be stored on stack 302, as shown in FIG. 3c. Indicator value 340 is arranged to indicate that the thread having stack 302 has invoked another synchronized method on object 310, since header value 314 is present on stack 302.

As previously mentioned, in one embodiment, threads may either be cooperative or concurrent. Cooperative threads differ from concurrent threads in that once a cooperative thread has control, the cooperative thread maintains control until the cooperative thread voluntarily relinquishes control. On the other hand, when a concurrent thread has control, the concurrent thread may lose control at any time.

In general, in order for a thread to execute a synchronized operation on an object, the thread obtains the lock associated with the object, as described above. In one embodiment, obtaining an object lock involves obtaining the value of the object header field. When a cooperative thread obtains an object lock, the cooperative thread holds the object lock until the cooperative thread has completed its use of the object, without interference from other threads. The steps associated with a cooperative thread obtaining an object lock will be described below with reference to FIG. 4a, whereas the steps associated with a cooperative thread relinquishing the object lock will be discussed below with respect to FIG. 4b.

Figure 4A:
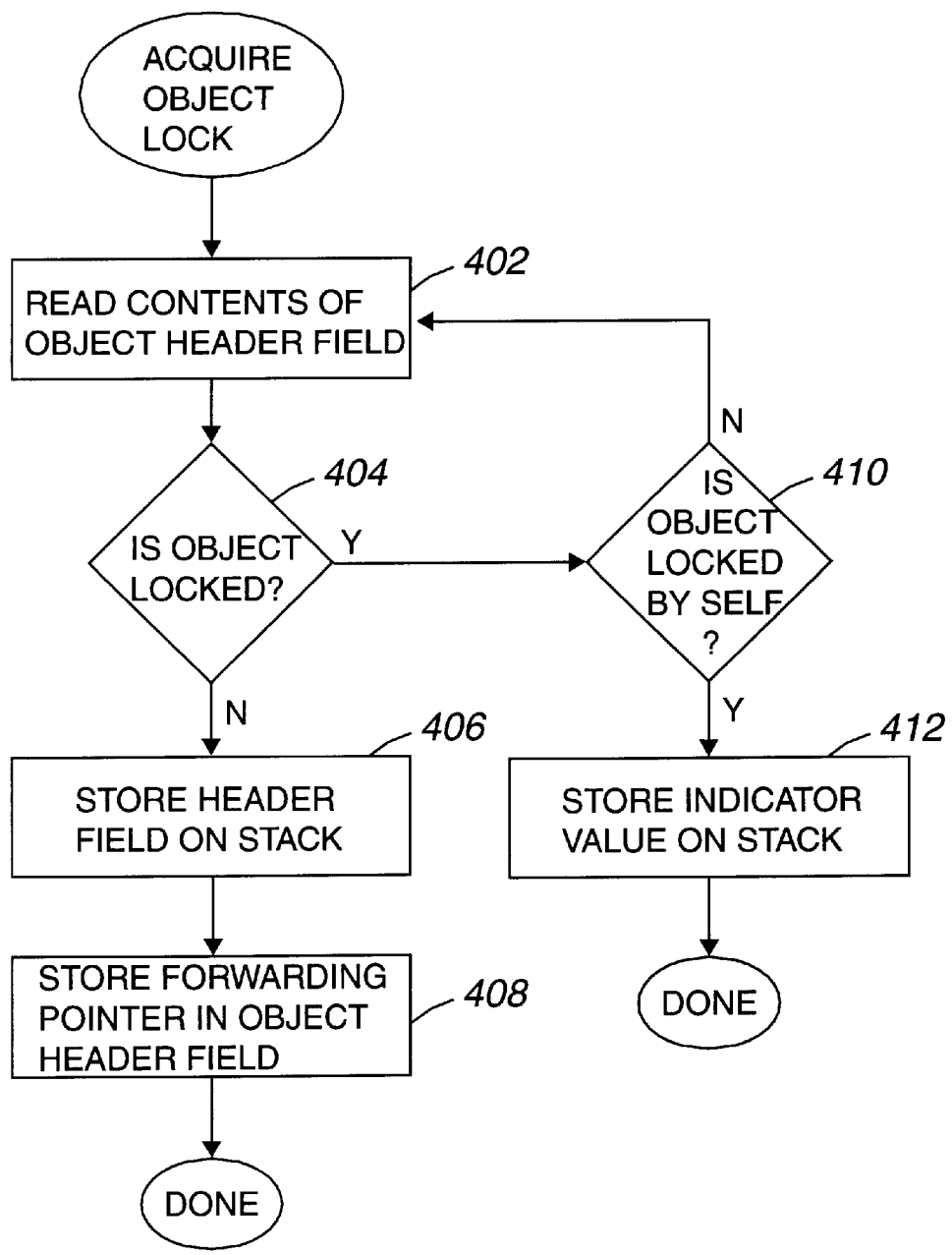
FIG. 4a is a process flow diagram which illustrates the steps associated with acquiring an object lock using a cooperative thread in accordance with an embodiment of the present invention.

With reference to FIG. 4a, a process of acquiring an object lock by a cooperative thread will be described in accordance with an embodiment of the present invention. In the described embodiment, the process of acquiring an object lock involves obtaining the value of the object header field, as mentioned above. The process begins at step 402 in which the thread reads, or obtains, the contents of the header field of the object. Then, in step 404, using the obtained contents of the object header field, a determination is made regarding whether the object is locked. In general, when an object is locked, the object header field contents include a forwarding pointer, or a reference, to a thread which has locked the object. Alternatively, when an object is unlocked, the object header field contents include the header value of the object.

If it is determined in step 404 that the object is not locked, then in step 406, the object header field contents are stored in the stack associated with the thread. In other words, the header value read from the object header field is stored on the stack. After the header value is stored on the stack, process flow moves to step 408 where a forwarding pointer is stored in the object header field. It should be appreciated that the forwarding pointer includes a reference to the specific location in the stack where the header value is stored, i.e., the forwarding pointer points to the location on the stack where the header value is stored. In one embodiment, the storage of header field contents on the stack and the storage of a forwarding pointer in an object header occur substantially simultaneously. Once the forwarding pointer is in place in the object header, the process of acquiring an object lock is completed.

Returning to step 404, if it is determined that the object is locked, then process flow moves to step 410 where the thread determines whether the thread, itself, already holds the lock on the object, i.e., whether the current synchronized operation is a re-entrant operation. If it is determined that the thread currently holds the lock on the object, then the implication is that the object is being accessed by a subsequent synchronized operation on the object by the thread. Therefore, in the described embodiment, an indicator value is stored on the stack associated with the thread in step 412 to indicate that the thread already holds the object lock, and that the object is being used by a re-entrant synchronized operation. In general, the indicator value may be any suitable value which indicates that the header value of the object is stored in another location on the thread stack. By way of example, the indicator value may the value zero. After the indicator value is stored in the stack, an object lock is considered to be acquired.

When a synchronized operation returns, the thread, e.g., the cooperative thread, which holds an object lock no longer needs the object associated with the object lock. Hence, the cooperative thread unlocks the object. Upon return or deactivation of the synchronized operation, when the header value of the object is encountered on the stack, the header value is stored over the forwarding pointer in the object header field. By returning the header value to the object header field, the object is unlocked, i.e., made free to be locked. Alternatively, when an indicator value reflecting a re-entrant lock acquisition is encountered on the thread stack when an attempt is made to unlock a locked object, the stack is "popped," as will be appreciated by those skilled in the art. Because the header value of the object remains on the thread stack in this latter case, the thread continues to hold the lock on the object until an unlocking operation is performed that returns the header value to the object header field.

In a cooperative threading model, a thread is allowed to maintain control until the thread voluntarily gives control to some other cooperative thread. Thus, once a cooperative thread has begun the operation of acquiring a lock on an object, this first cooperative thread may ensure that no second cooperative thread will gain control and be permitted to run until the first cooperative thread has completed acquiring the lock. Alternatively, if the lock on the object is already owned by some other cooperative thread, the first cooperative thread may ensure that no second cooperative thread will gain control and be permitted to run until the first cooperative thread has arranged to wait for the lock on the object to become free.

Figure 4B:
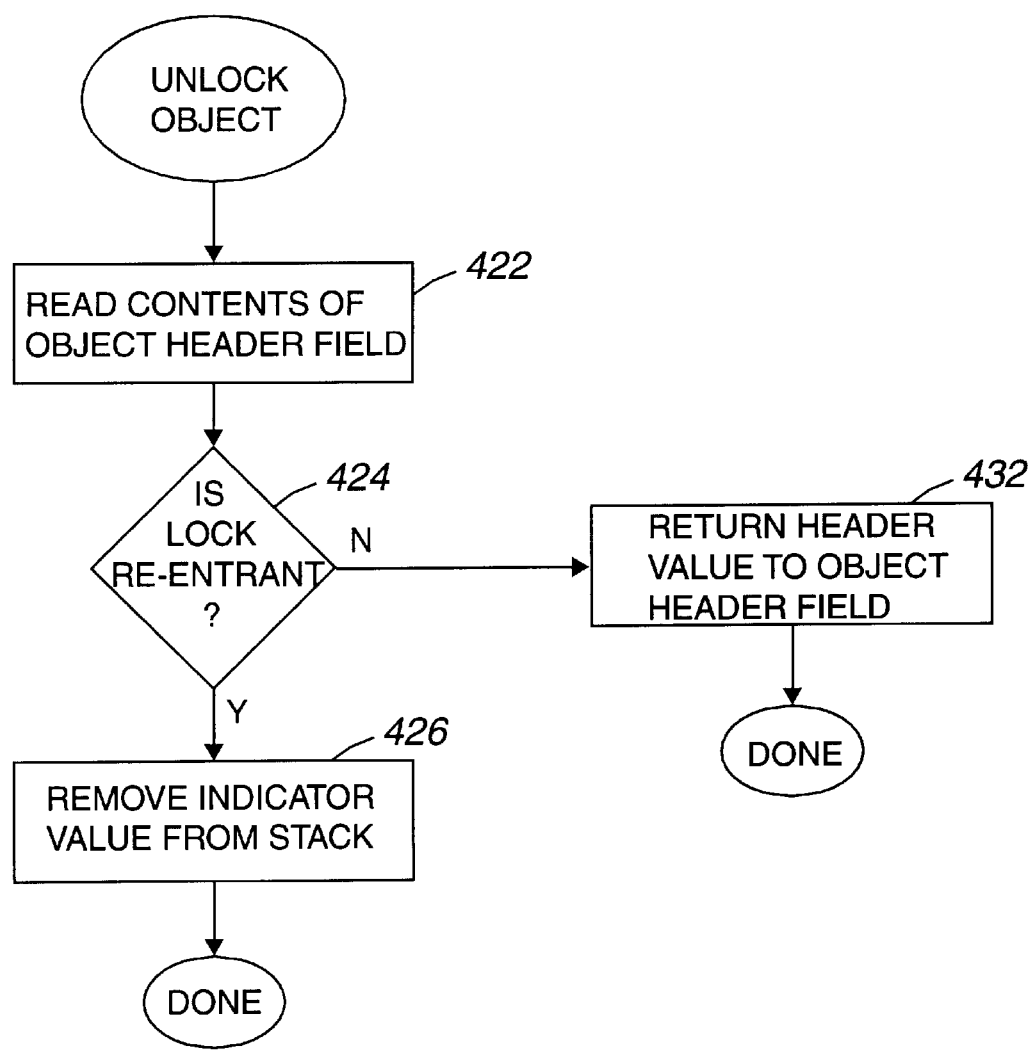
FIG. 4b is a process flow diagram which illustrates the steps associated with unlocking an object locked using a cooperative thread in accordance with an embodiment of the present invention.

FIG. 4b is a process flow diagram which illustrates the steps associated with a cooperative thread unlocking an object which it has previously locked in accordance with an embodiment of the present invention. The process begins at step 422 where the object header field contents are read from the object which is to be unlocked. It should be appreciated that the same cooperative thread which is attempting to unlock the object has previously locked the object. Once the contents of the object header field are obtained, a determination is made in step 424 regarding whether the lock on the object is a re-entrant lock. In other words, a determination is made as to whether the contents of the object header field indicate that the object is also locked by a previous synchronized operation invoked by the thread on the object, in addition to the current synchronized operation which is associated with unlocking the object.

If it is determined that the lock is re-entrant, then in step 426, the indicator value which indicates that the lock is being used by a re-entrant synchronized operation is popped from the stack. As previously mentioned, the indicator value may be any suitable value which indicates that the header value of the object is stored in another location on the thread stack. Once the indicator value is removed, with respect to the current synchronized operation, the process of unlocking the object is considered to be completed. It should be appreciated, however, that the object is still locked by the same cooperative thread with respect to a previous synchronized operation performed by the same cooperative thread on the object.

If it is determined in step 424 that the lock is not re-entrant, then process flow moves to step 432 in which the header value is returned from the thread stack to the object header field. Once the header value is returned, the object is unlocked, and the process of unlocking the object is completed.

Figure 5:
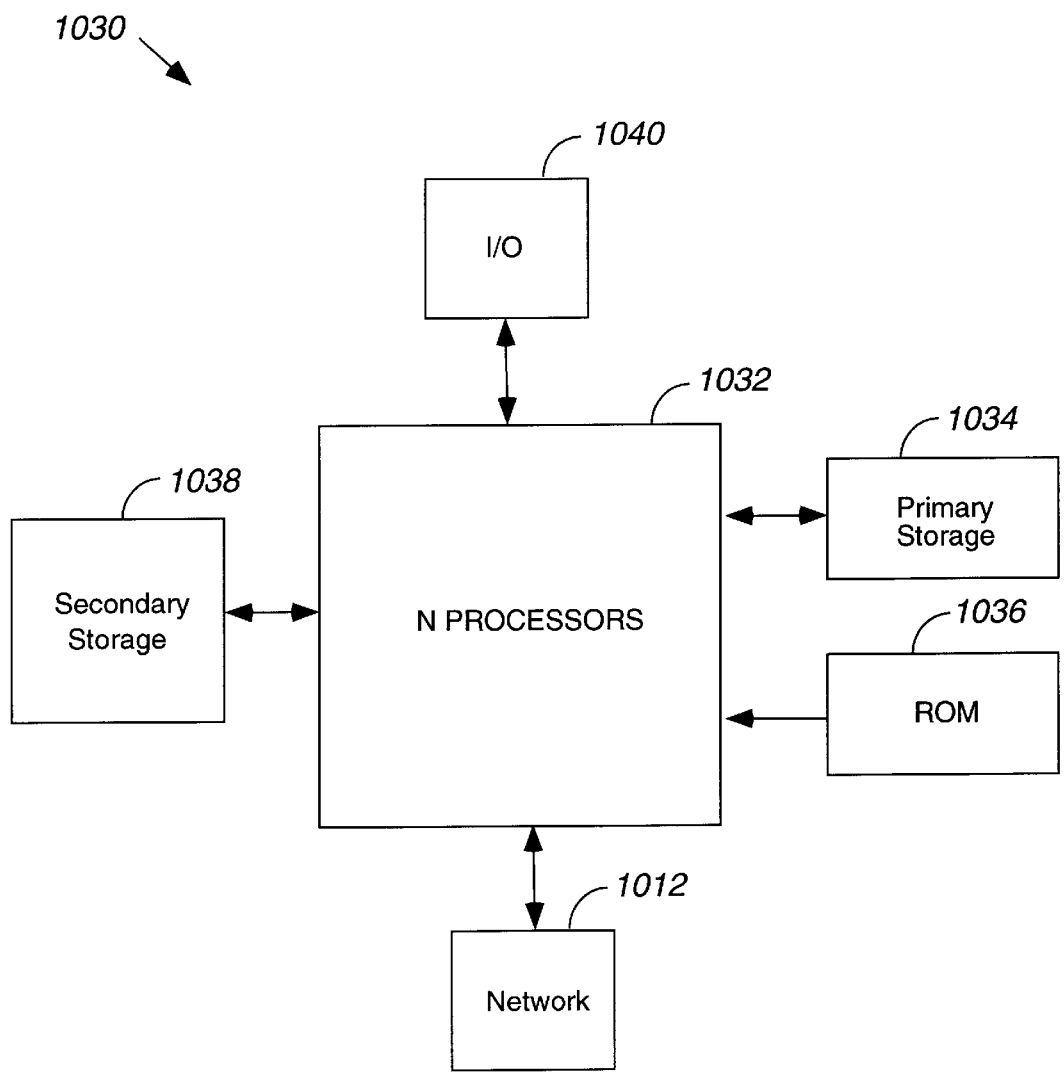
FIG. 5 is a diagrammatic representation of a general-purpose computer system suitable for implementing the present invention.

In general, the use of stacks to implicitly indicate the locking status of an object may be implemented on any suitable computer system. FIG. 5 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM).

Computer system 1030 or, more specifically, CPUs 1032, may be arranged to support a virtual machine, as will be appreciated by those skilled in the art. One example of a virtual machine that is supported on computer system 1030 will be described below with reference to FIG. 6. As is well known in the art, ROM acts to transfer data and instructions uni-directionally to the CPUs 1032, while RAM is used typically to transfer data and instructions in a bidirectional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 6:
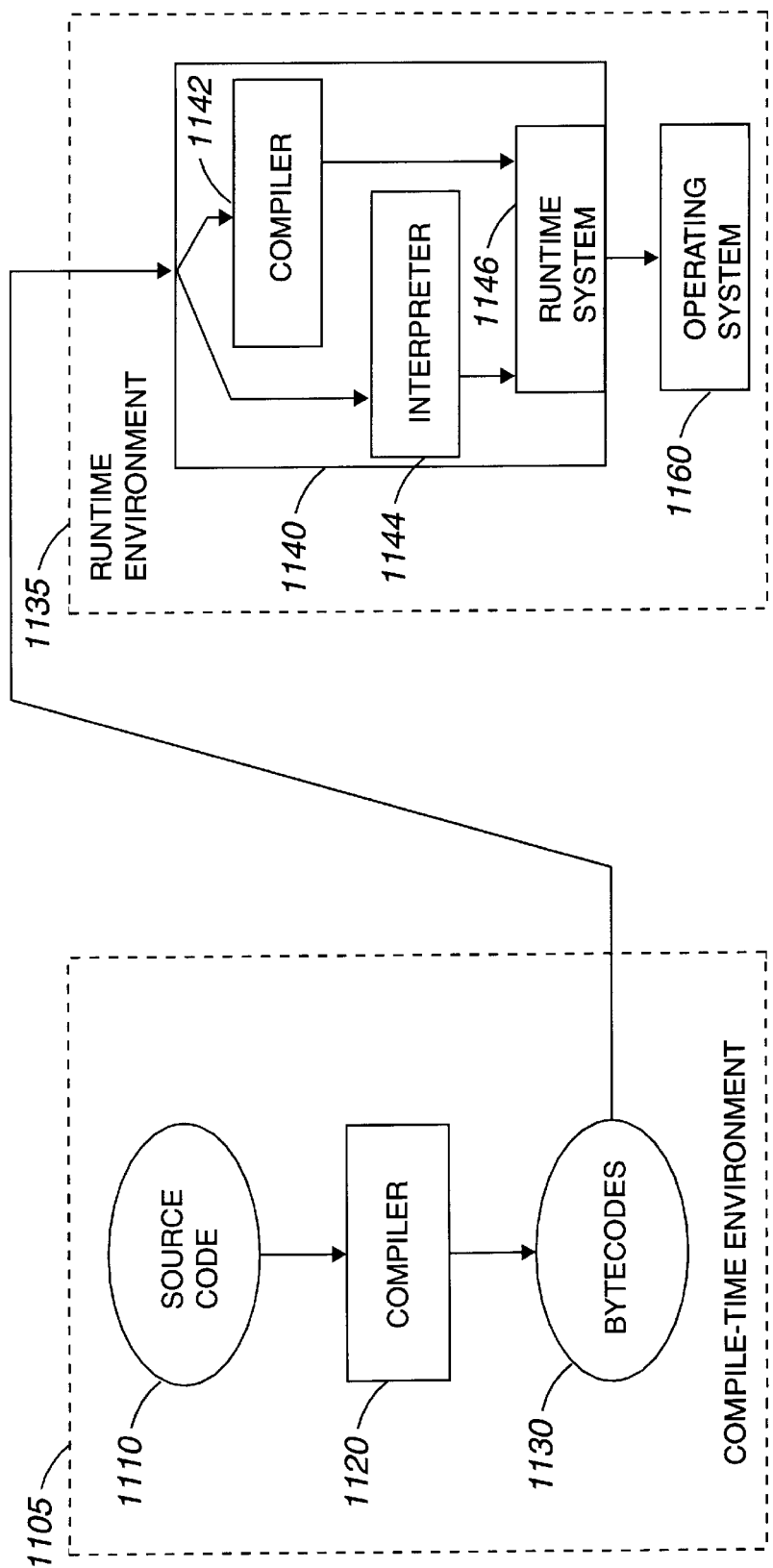
FIG. 6 is a diagrammatic representation of a virtual machine suitable for implementing the present invention.

As previously mentioned, a virtual machine may execute on computer system 1030. FIG. 6 is a diagrammatic representation of a virtual machine which is supported by computer system 1030 of FIG. 5, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 5, or stored on a storage device such as primary storage 1034 of FIG. 5. In the described embodiment, bytecodes 1130 are platform independent.

That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 5. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, steps involved with locking an object and unlocking an object may be reordered. Steps may also be removed or added without departing from the spirit or the scope of the present invention.

Although the methods of locking and unlocking objects in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

Status indicators have been described as being bits which identify whether an object is locked or unlocked. Although the number of bits associated with a status indicator has been described as being a single bit, the number of bits associated with a status indicator may generally be widely varied. In addition, it should be appreciated that the status of an object may be identified using mechanisms other than a status indicator. By way of example, the object may include a pointer to a list which identifies the status of the object.

While the present invention has been described as being used with a computer system which has an associated virtual machine, it should be appreciated that the present invention may generally be implemented on any suitable object-based computer system. Specifically, the methods of locking an unlocking an object in accordance with the present invention may generally be implemented in any multi-threaded, object-based system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for unlocking an object using a first thread, the object including an object header field, the first thread having an associated first stack, wherein the object is locked by the first thread, the method comprising:

a) obtaining contents of the object header field;

b) determining when the object is locked recursively; and c) when it is determined that object is locked recursively, removing an indicator value from the first stack, wherein the indicator value is arranged to indicate that the object is locked recursively.

2. A computer-implemented method as recited in claim 1 wherein when it is determined that the object is not locked recursively, the method further includes returning a header value stored in the first stack to the object header field, wherein the header value is associated with the object.

3. A computer system for unlocking an object using a first thread, the object including an object header field, the first thread having an associated first stack, wherein the object is locked by the first thread, the computer system comprising:

a first mechanism for obtaining contents of the object header field;

a second mechanism for determining when the object is locked recursively; and a third mechanism for removing an indicator value from the first stack when it is determined that the object is locked recursively, wherein the indicator value is arranged to indicate that the object is locked recursively.

4. A computer system according to claim 3 wherein the third mechanism is arranged to return a header value stored in the first stack to the object header field when it is determined that the object is not locked recursively, the header value being associated with the object.

5. A computer program product for unlocking an object using a first thread, the object including an object header field, the first thread having an associated first stack, wherein the object is locked by the first thread, the computer program product comprising:

computer code that obtains the contents of the object header field;

computer code that determined when the object is locked recursively;

computer code that removes an indicator value from the first stack when it is determined that the object is locked recursively, wherein the indicator value is arranged to indicate that the object is locked recursively; and a computer-readable medium that stores the computer codes.

6. A computer program product according to claim 5 further including computer code that returns a header value stored in the first stack to the object header field when it is determined that the object is not locked recursively, the header value being associated with the object.

* * * * *